United States Patent [19]
Araki et al.

[11] Patent Number: 5,285,639
[45] Date of Patent: Feb. 15, 1994

[54] METHOD AND SYSTEM FOR CONTROLLING SECONDARY AIR FOR INTERNAL COMBUSTION ENGINE

[75] Inventors: Akihiko Araki; Toshio Namba; Masanobu Osaki, all of Isesaki, Japan

[73] Assignee: Japan Electronic Conrol Systems Co., Ltd., Isesaki, Japan

[21] Appl. No.: 911,628

[22] Filed: Jul. 10, 1992

[30] Foreign Application Priority Data

Jul. 12, 1991 [JP] Japan .................................. 3-172656

[51] Int. Cl.⁵ ................................................ F01N 3/22
[52] U.S. Cl. .......................................... 60/274; 60/276; 60/289; 123/691
[58] Field of Search .............. 60/274, 276, 277, 289; 123/691

[56] References Cited

U.S. PATENT DOCUMENTS

| | | | |
|---|---|---|---|
| 4,375,746 | 3/1983 | Hattori | 60/289 |
| 4,383,408 | 5/1983 | Ujihashi et al. | 60/277 |
| 4,385,491 | 5/1983 | Sakurai et al. | 60/289 |
| 4,391,256 | 7/1983 | Sawada et al. | 60/289 |
| 5,060,474 | 10/1991 | Aramaki | 60/277 |
| 5,088,281 | 2/1992 | Izutani et al. | 60/285 |
| 5,113,651 | 5/1992 | Kotzan et al. | 60/289 |
| 5,119,631 | 6/1992 | Kayanuma et al. | 60/274 |
| 5,140,810 | 8/1992 | Kuroda | 60/274 |
| 5,152,137 | 10/1992 | Nishizawa | 60/289 |
| 5,175,997 | 1/1993 | Blanke, Sr. | 60/289 |

FOREIGN PATENT DOCUMENTS

| | | | |
|---|---|---|---|
| 53-9663 | 4/1978 | Japan . | |
| 0032947 | 3/1980 | Japan | 60/277 |

Primary Examiner—E. Rollins Cross
Assistant Examiner—Thomas Moulis
Attorney, Agent, or Firm—Foley & Lardner

[57] ABSTRACT

Secondary air is supplied to a position upstream of a catalyst disposed in an exhaust passage of an engine. An oxygen sensor is disposed between a secondary air supply portion of the exhaust passage and the catalyst. The supply amount of the secondary air is feedback controlled so that the oxygen concentration in the exhaust gas detected by the oxygen sensor approaches a target value corresponding to a theoretical air/fuel ratio. A second oxygen sensor for air/fuel ratio control is disposed upstream of the secondary air supply portion. Air/fuel ratio feedback control adjusts the air/fuel ratio of air entering the engine so that the oxygen concentration at the second oxygen sensor approaches the same target value as at the other oxygen sensor.

12 Claims, 4 Drawing Sheets

METHOD AND SYSTEM FOR CONTROLLING SECONDARY AIR FOR INTERNAL COMBUSTION ENGINE

BACKGROUND OF THE INVENTION

1. Field of the Invention

The present invention relates generally to a method and system for controlling the secondary air for an internal combustion engine. More particularly, the invention relates to a technology for improving the conversion efficiency of a catalyst by controlling the amount of the secondary air to be supplied to an exhaust passage upstream of the catalyst, in an internal combustion engine to which the catalyst is provided for emission control.

2. Description of the Related Art

Conventionally, there are internal combustion engines which are equipped with catalytic converters for purification of CO, HC and NOx contained in exhaust gas. In such catalytic converters, it is required to maintain an exhaust gas temperature (catalyst temperature) at the inlet of the catalyst to be high enough for promoting a chemical reaction (oxidation and reducing reaction) in the catalyst and thus for assuring the necessary converting ratio.

Therefore, in the prior art, there has been proposed a technology, in which the secondary air (oxygen) is supplied to the exhaust passage upstream of the catalyst for promoting burning (oxidation of CO and HC) in the exhaust system so that the inlet temperature of the catalyst is maintained high enough. (see Japanese Examined Patent Publication No. 53-9663)

When the secondary air is supplied as set forth above, burning of CO and HC contained in the engine exhaust can be promoted upon starting up of the engine where an air/fuel ratio mixture is richer than the theoretical value. By this, the exhaust temperature can be increased to elevate the temperature of the catalyst to an active temperature thereof.

On the other hand, while the catalyst temperature is already at the active temperature, it becomes possible to supply the oxygen by supplying secondary air for promoting an oxidizing reaction between HC and CO while the combustion in the engine is performed using a richer air/fuel ratio mixture than the theoretical value, to cause a lowering of the conversion ratio (oxidizing reaction) of HC and CO in the catalyst due to lack of oxygen.

On the other hand, in the supply of the secondary air as set forth above, it is desired to supply an optimal amount of the secondary air depending upon the air/fuel ratio condition (the concentration of CO and HC). For instance, if an excess amount of the secondary air is supplied upon starting up the engine, an increase in the catalyst temperature can be interfered with by excessive secondary air which is not used for burning of CO and HC. On the other hand, if the amount of the secondary air is too small, burning of CO and HC becomes insufficient and thus makes it impossible to achieve quick elevation of the catalyst temperature as expected for supply of the secondary air.

Furthermore, when the secondary air is supplied after the catalyst reaches the active temperature, the excess amount of the air may cause the lean exhaust air/fuel ratio to lower the conversion ratio of NOx in the catalyst. On the other hand, if the amount of the secondary air is too small, the exhaust air/fuel ratio becomes too rich, making it difficult to achieve satisfactory improvement of the conversion ratio of HC and CO.

As set forth above, the amount of supply of the secondary air is desired to be controlled depending upon the current air/fuel ratio condition. In the control of the secondary air in the prior art, however, the supply of the secondary air is switched between ON and OFF depending on the engine driving condition, or, in the alternative, is controlled on the basis of a predetermined secondary air amount depending upon the engine load and engine speed. Therefore, it has not been possible to control the secondary air precisely depending upon the actual air/fuel ratio, making it difficult to stabilize the conversion ratio of the catalyst at a high level, and thus making it difficult to stably maintain the exhaust characteristics.

SUMMARY OF THE INVENTION

Therefore, it is an object of the invention to provide a method and a system for controlling secondary air, which can precisely control the amount of the secondary air depending upon an air/fuel ratio condition, and thus enhance emission control performance of a catalyst.

Another object of the invention is to provide a method and a system for controlling secondary air, which can both assure a high response and prevent overshooting.

A further object of the invention is to provide a method and a system for controlling secondary air, which performs supply control of the secondary air only when it is required and avoids unnecessary supply control of the secondary air.

In order to accomplish the above-mentioned objects, there are according to the present invention a method and a system for controlling the secondary air for an internal combustion engine provided with a catalyst in an exhaust passage of the engine for emission control, and for controlling the amount of secondary air supplied to the exhaust passage upstream of the catalyst, in which the oxygen concentration at a position between the catalyst and the secondary air supply portion is detected by an oxygen sensor, and the supply amount of the secondary air is controlled so that the detected oxygen concentration approaches a target value.

With such a construction, the oxygen sensor is sensitive to the oxygen concentration contained in a mixture gas of the exhaust gas of the engine and the secondary air and the air flowing into the catalyst. Accordingly, by controlling the secondary air amount so as to approach the target value of the detected oxygen concentration, a deficient amount of oxygen in the exhaust gas supplied to the catalyst can be compensated for by providing a precise supply of the secondary air.

On the other hand, in the present invention, the secondary air supply amount is set on the basis of the detected oxygen concentration in the exhaust passage between the catalyst and the secondary air supply portion, and the operational magnitude of the secondary air amount can be varied depending upon the intake air flow amount of the engine.

With such a construction, the supply of secondary air can be adjusted to thereby attain the target value of the detected oxygen concentration because the variation speed of the secondary air amount depends upon the intake air flow amount of the engine, and, in other words, depends upon the exhaust flow amount.

Furthermore, in addition to the oxygen sensor for controlling the secondary air, an oxygen sensor for controlling an air/fuel ratio may be provided at a position upstream of the secondary air supply portion. Feedback for an air/fuel ratio of an air/fuel mixture for the engine may be controlled so that the oxygen concentration detected by the oxygen sensor for the air/fuel ratio control approaches a target value that is the same as that for the secondary air amount feedback control at a predetermined engine operating condition.

In this case, in the predetermined engine operating condition thereby enabling air/fuel ratio feedback control, it becomes possible to obtain an oxygen concentration in the exhaust gas at the approximate target value for the secondary air amount control without the secondary air amount control.

Here, when the air/fuel ratio feedback control is performed, the oxygen concentration in the exhaust gas becomes stable at the target value, and it becomes possible to forcibly terminate the supply of the secondary air. Therefore, it becomes possible to control the feedback of the secondary air amount only when the air/fuel ratio feedback control is not performed.

On the other hand, it is possible to have a construction in which the secondary air pumped by the air pump and regulated at a predetermined pressure by the pressure regulator is adjusted to the supply amount depending upon the status of the electromagnetic valve.

In this case, the supply of secondary air is controlled by the status of the electromagnetic valve.

Furthermore, the target value of the oxygen concentration in setting the secondary air amount may be a value corresponding to a theoretical air/fuel ratio. By this, the lowering of the reducing reaction of the catalyst by excessive oxygen concentration in the exhaust gas is avoided.

Other objects and advantages of the present invention will become clear from the following discussion in terms of the preferred embodiment with reference to the accompanying drawings.

DESCRIPTION OF THE PREFERRED EMBODIMENT

The preferred embodiment of a method and a system for controlling secondary air for an internal combustion engine according to the present invention is illustrated in FIGS. 2 to 5.

Figure 1:
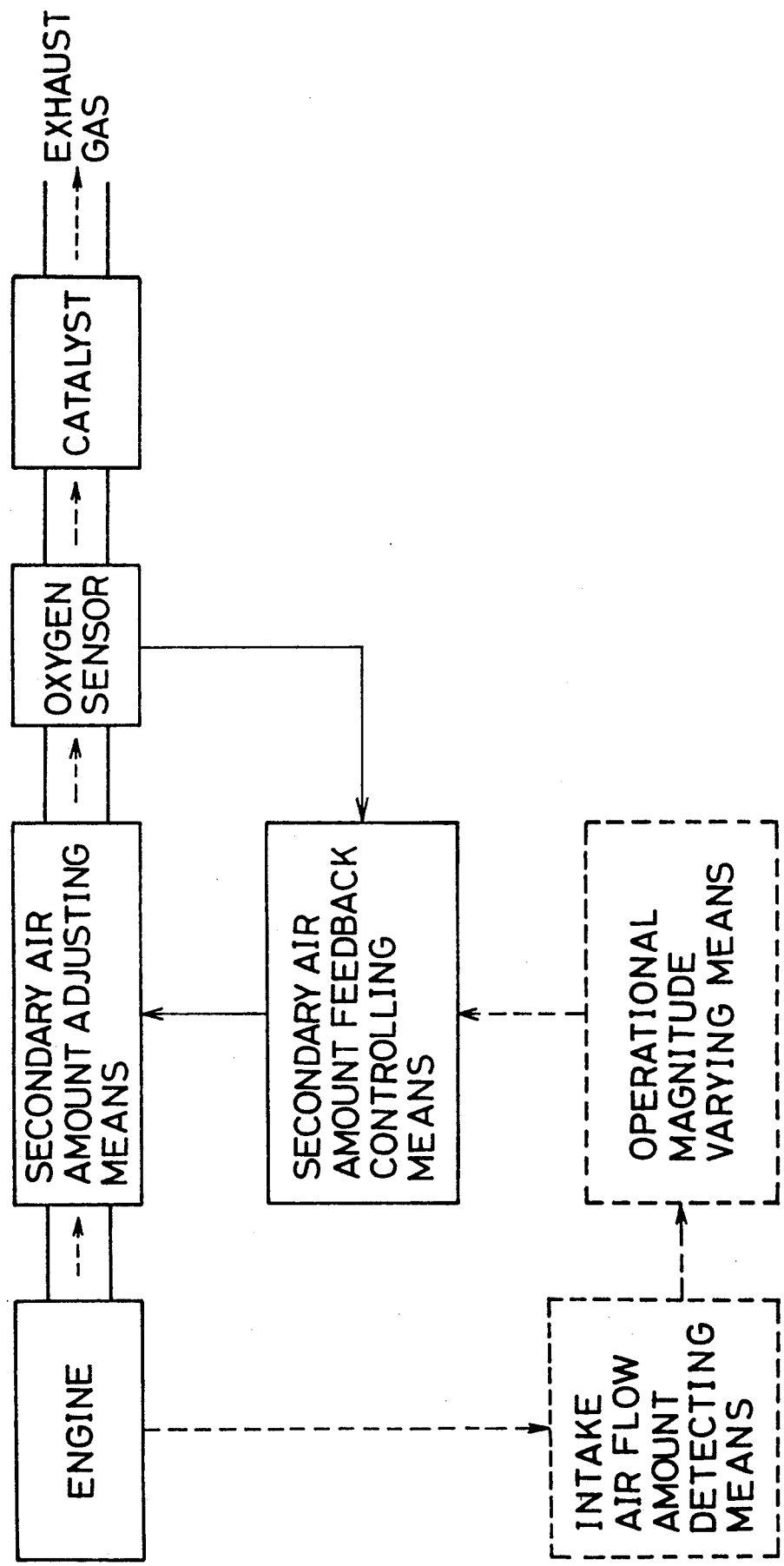
FIG. 1 is a block diagram showing a basic construction of a secondary air control system for an internal combustion engine according to the present invention.

It should be noted that the basic construction of the secondary air controlling system for the internal combustion engine, according to the present invention, is as illustrated in FIG. 1. The following discussion will be given with reference to FIG. 1.

Figure 2:
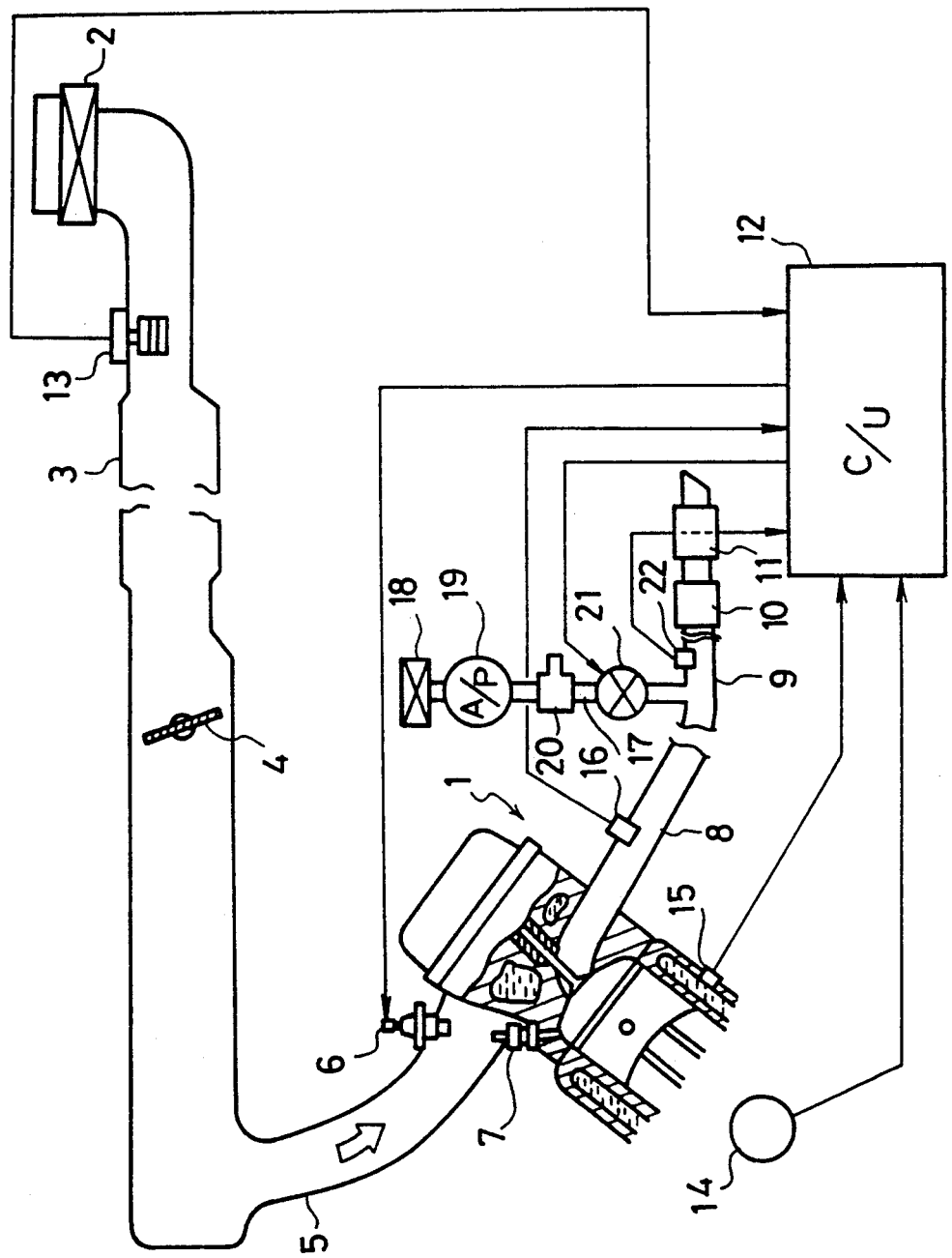
FIG. 2 is a schematic diagram showing one embodiment of a method and a system for controlling secondary air for an internal combustion engine according to the invention.

In the embodiment, the system construction of which is illustrated in FIG. 2, air is introduced into an internal combustion engine 1 through an air cleaner 2, an intake duct 3, a throttle valve 4 and an intake manifold 5.

In each branch of the intake manifold 5, a fuel injection valve 6 for a corresponding engine cylinder is provided. The fuel injection valve 6 comprises an electromagnetic fuel injection valve that is opened while a solenoid is energized and closed by the termination of energization of the solenoid. The fuel injection valve 6 is thus driven to open in response to a drive pulse signal from a control unit 12, which will be discussed later, to inject a predetermined pressure of fuel that is pumped from a fuel pump (not shown) and regulated by a pressure regulator (not shown), for supplying the engine 1.

A spark ignition plug 7 is provided in each of the combustion chambers of the engine. The spark ignition plug 7 generates a spark for ignition of an air/fuel mixture for combustion. An exhaust gas from the engine 1 is discharged through an exhaust manifold 8, an exhaust duct 9, a catalytic converter 10 for emission control and a muffler 11 to the atmosphere.

The control unit comprises a microcomputer formed with CPU, ROM, RAM, A/D converter and an input/output interface. The control unit 12 receives input signals from various sensors and performs the following arithmetic operation to control the operation of the fuel injection valve (fuel supply amount for the engine).

An air flow meter 13 is provided in the intake duct 3 as an intake air flow amount detecting means. The air flow meter 13 outputs a signal corresponding to an intake air flow amount Q of the engine 1.

A crank angle sensor 14 is provided. In the case of a four-cylinder engine as in the shown embodiment, the crank angle sensor 14 produces a crank reference signal REF every 180° of the crank angle and a crank position signal POS at every 1° or 2° of a crank angular displacement. Here, by measuring the period of the crank reference signal REF or by counting the number of the crank position signals POS occurring within a given period, the engine speed N can be derived.

Also, an engine coolant temperature sensor 15 is provided for detecting the temperature Tw of an engine coolant in a water jacket of the engine 1.

Figure 4:
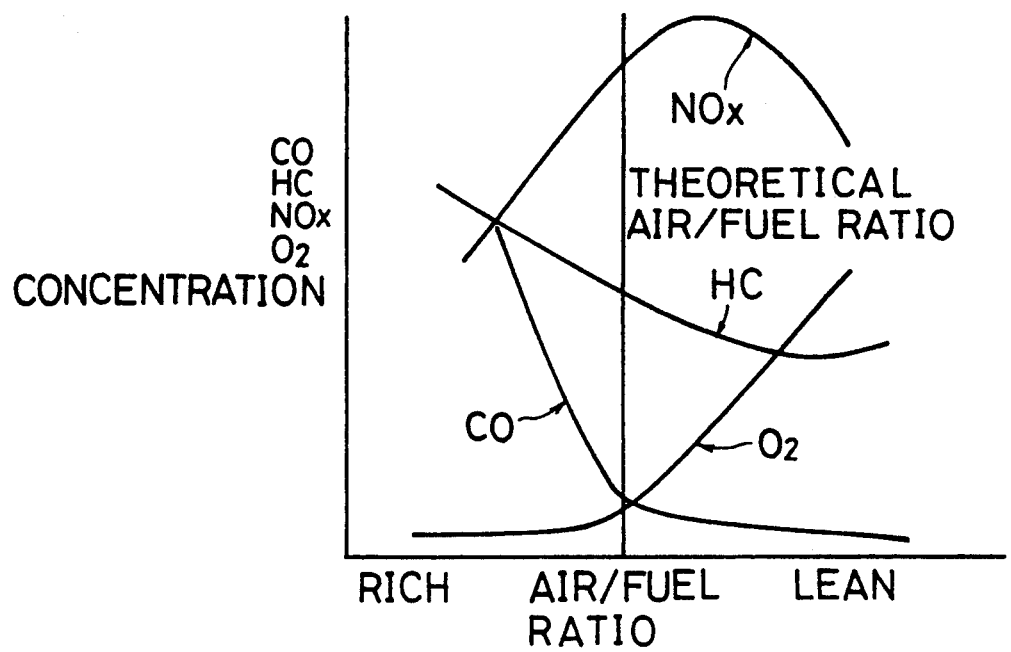
FIG. 4 is a chart showing a relationship between an air/fuel ratio and an exhaust component concentration.

On the other hand, in a confluent of the exhaust manifold 8, an oxygen sensor (the oxygen sensor for controlling an air/fuel ratio) is provided. The oxygen sensor 16 is a known sensor that adjusts the output value depending upon oxygen concentration in the exhaust gas. For instance, the oxygen sensor 16 is designed to produce an electromotive force depending upon an oxygen concentration ratio relative to the atmosphere. As shown in FIG. 4, the oxygen concentration in the exhaust gas varies abruptly across a range of theoretical values. Therefore, the air/fuel ratio of the air/fuel mixture introduced into the engine can be discriminated between rich and lean on the basis of the output value of the oxygen sensor 16.

Here, the control unit 12 calculates a fuel injection amount Ti for the fuel injection valve 6 in the following manner.

At first, a basic fuel injection amount $Tp (= K \times Q/N;$ $K$: constant) is calculated on the basis of the intake air flow amount Q detected by the air flow meter 13 and the engine speed N derived on the basis of the signal from the crank angle sensor 14.

On the other hand, when a predetermined feedback control condition (predetermined engine operating condition) is satisfied, an air/fuel ratio feedback correction coefficient LMD for feedback control of the actual air/fuel ratio to the theoretical value is determined on the basis of a comparison of the output value of the oxygen sensor 16 and a target value corresponding to the theoretical air/fuel ratio. It should be noted that the function of the control unit 12 for setting the correction coefficient LMD corresponds to an air/fuel ratio feedback control means.

The control unit 12 further derives a basic correction coefficient for enrichment of the air/fuel ratio under cold engine conditions on the basis of the engine coolant temperature detected by the engine coolant temperature sensor 15, and there are various correction coefficients COEF, including an enrichment correction coefficient for enrichment of the air/fuel ratio over the theoretical value upon starting-up or during high engine load conditions and so forth.

Also, in order to compensate for a fluctuation of an effective valve open period of the fuel injection valve 6, which is dependent upon the voltage of a battery, a correction component Ts is derived.

By correcting the basic fuel injection amount Tp with respective correction factors, a final fuel injection amount Ti ($\leftarrow$Tp$\times$COEF$\times$LMD+Ts) is set.

Here, at a predetermined fuel injection timing, the drive pulse signal having pulse width corresponding to the most recently derived fuel injection amount Ti is output to the fuel injection valve 6 to control the fuel injection amount by opening the fuel injection valve 6.

On the other hand, in the internal combustion engine of the shown embodiment, the following secondary air supply system is provided. Namely, to the exhaust duct 9 (the exhaust passage) at the position downstream of the oxygen sensor 16 and upstream of the catalytic converter 10, one end of a secondary air supply pipe 17 is connected. A sub-air cleaner 18 is provided at the other end of the pipe 17. In the intermediate position, an air pump 19 forming a secondary air amount adjusting means, a pressure regulator 20, and an electromagnetic valve 21 are provided in this order from the upstream side. With such a construction, the secondary air filtered by the sub-air cleaner 18 and pressurized by the air pump 19 which is driven by the engine, is regulated by the pressure regulator 20 and supplied to the exhaust system upstream of the catalytic converter in an amount depending upon the status of the electromagnetic valve 21.

On the other hand, a sub-oxygen sensor 22 that has an identical construction as the foregoing oxygen sensor 16 is provided in the exhaust duct 9 at a position downstream of the joint portion (secondary air supply portion) of the exhaust duct 9 and upstream of the catalytic converter 10. The sub-oxygen sensor 22 is a sensor for varying its output by sensing the oxygen concentration in the mixture gas of the engine exhaust and the secondary air.

The electromagnetic valve 21 is designed to be opened by a duty control signal supplied from the control unit 12. In a manner shown in the flowchart of FIG. 3, the control unit 12 determines the duty ratio (time ratio of a period to drive the electromagnetic valve 21 to open) of the duty signal. It should be noted that, as shown in FIG. 3, the secondary air amount feedback control means, an operational magnitude varying means, and a secondary air supply terminating means, are provided in the control unit 12 in the form of software.

Figure 3:
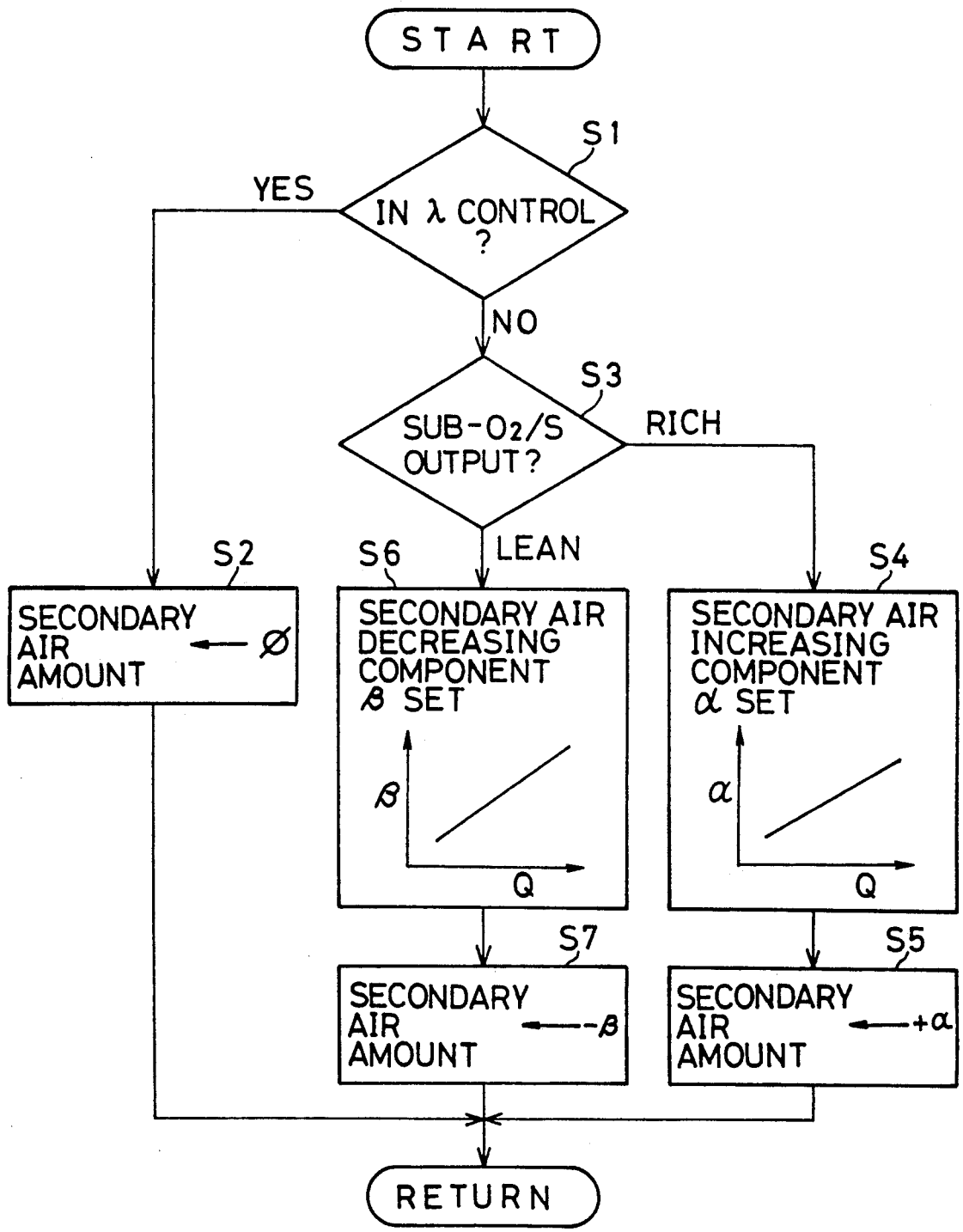
FIG. 3 is a flowchart showing a preferred process of a feedback control of the secondary air amount.

In the flowchart of FIG. 3, initially, at step 1 (labeled as S1 in the drawing, and similarly for other steps), it is determined whether the air/fuel ratio feedback control toward the theoretical air/fuel ratio employing the oxygen sensor 16 is active or not. In other words, at step 1, a check is performed to determine whether the engine operating condition satisfies the predetermined condition for performing an air/fuel ratio feedback control.

Here, when the predetermined feedback control condition is satisfied and the Closed Loop control (feedback control) for the air/fuel ratio is active, the air/fuel to be introduced into the engine is controlled toward the theoretical air/fuel ratio. Then, the theoretical air/fuel ratio is the air/fuel ratio, at which all of the converting ratios of the catalytic converter 10 for HC, CO and NOx become optimal, as shown in FIG. 3. In engine 1 of the shown embodiment, when the temperature of the catalyst 10 is low, such as when starting-up the engine, the air/fuel ratio control is performed by an Open Loop to make the air/fuel ratio rich.

Accordingly, while the Closed Loop control for the air/fuel ration control is active, it is unnecessary to supply the secondary air for elevating the temperature of the catalyst 10 and improving the conversion ratio. Therefore, while the air/fuel ratio feedback control is active, the secondary air amount is set at zero to control the electromagnetic valve 21 to be set at the fully closed position, at step 2. The process of step 2 corresponds to the secondary air supply terminating means.

Figure 5:
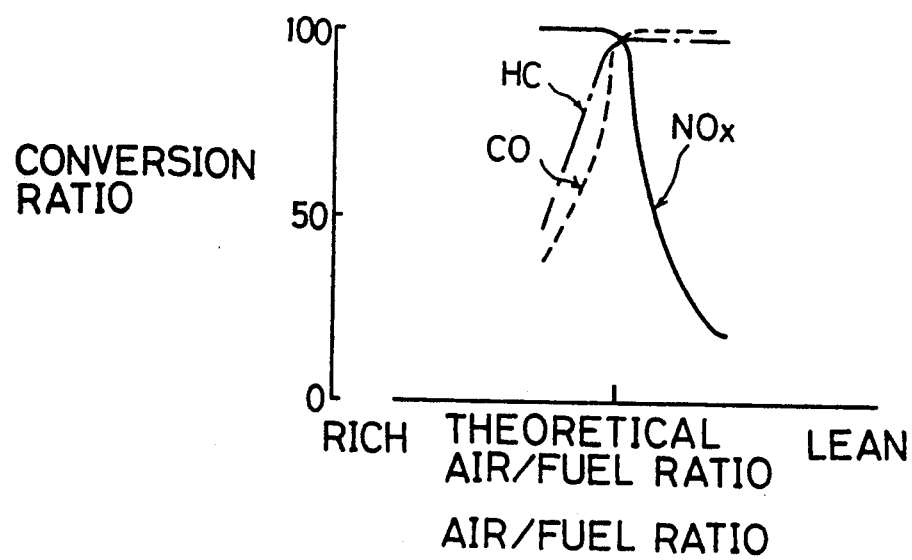
FIG. 5 is a chart showing a relationship between an air/fuel ratio and a conversion ratio in a catalytic converter.

On the other hand, when the feedback control condition is not satisfied and the Open Loop control is performed for controlling the air/fuel ratio, the basic air/fuel ratio is set richer than the theoretical air/fuel ratio. In such a rich air/fuel ratio condition out of the theoretical air/fuel ratio, the conversion ratio of HC and CO is lowered as shown in FIG. 5.

The lowering of the conversion ratio of HC and CO is the rich air/fuel ratio condition 19 caused by a lack of oxygen. Therefore, by increasing the oxygen amount in the exhaust gas by a supply of secondary air after the firing of the HC and CO in the exhaust system, the oxidizing reaction in the catalyst 10 is promoted.

On the other hand, when the air/fuel ratio is made particularly rich upon starting up the engine and, in addition, the temperature of the catalytic converter 10 is lower than the active temperature, the temperature of the catalytic converter can be swiftly increased to the active temperature by the burning heat of HC and CO by promoting the firing of CO and HC (burning in the exhaust passage upstream of the catalyst) by a supply of the secondary air.

Therefore, if it is determined that the feedback control for the air/fuel ratio is not active at step 1, the process is advanced to step 3, in which the output value of the sub-oxygen sensor 22 is compared with a threshold level (target value) corresponding to the theoretical air/fuel ratio. Then, it is determined whether the oxygen concentration immediately before the catalytic converter 10 is smaller or greater than the level corresponding to the stoichiometric air/fuel ratio.

It should be appreciated that, since the shown construction supplies the secondary air at the position upstream of the oxygen sensor 22, the oxygen concentration detected by the sub-oxygen sensor 22 does not represent the air/fuel ratio of the air/fuel mixture introduced into the engine but represents the oxygen concentration of the mixture gas of the engine exhaust gas and the secondary air to be introduced into the catalytic converter 10.

For instance, when the engine operating condition is shifted out of the condition satisfying the air/fuel ratio feedback control so that the air/fuel ratio is set at the richer side of the theoretical air/fuel ratio, the oxygen concentration in the exhaust is lowered. Therefore, the oxygen concentration detected by the sub-oxygen sensor 22 is lowered. And at this time, the determination for the rich air/fuel ratio is made and the process is advanced at step 4.

At step 4, an increasing correction component $\alpha$ corresponding to the current intake air flow amount Q is determined by a map storing the secondary air amount correction component $\alpha$ relative to the current intake air flow amount Q. By variably setting the increasing correction component $\alpha$ as the operational magnitude of the feedback control based on the instantaneous intake air flow amount, it becomes possible to maintain high response characteristics and avoid the occurrence of overshooting. Therefore, convergence in feedback control of the secondary air can be assured.

At step 5, with respect to the previously set secondary air amount set at the immediately preceding cycle, the increasing correction component $\alpha$ searched at the foregoing step 4 is added to perform a correction of the secondary air amount. Then, the signal having a duty ratio corresponding to the secondary air amount and corrected with the increasing correction component is fed to the electromagnetic valve 21.

Accordingly, when the basic air/fuel ratio is set at the richer side and thus the oxygen concentration in the exhaust gas is lowered, the correction of the secondary air amount in step 5 is maintained until the oxygen concentration detected by the sub-oxygen sensor 22 is reversed to a level (rich detecting condition) lower than the level corresponding to the theoretical air/fuel ratio. During this period, the secondary air amount is increased in a stepwise fashion by a predetermined amount depending upon the instantaneous intake air flow amount.

When the oxygen concentration immediately upstream of the catalyst 10 exceeds the level corresponding to the theoretical air/fuel ratio by increasing the secondary air, the oxygen concentration detected by the sub-oxygen sensor 22 at step 3 becomes higher than the level corresponding to the theoretical air/fuel ratio. Then, the process is advanced from step 3 to step 6.

At step 6, in the same manner as the foregoing step 4, a decreasing correction component $\beta$ corresponding to the instantaneous intake air flow amount Q is derived by looking up a map preliminarily storing the decreasing correction components $\beta$ of the secondary air corresponding to the intake air flow amount Q.

At the next step 7, the decreasing correction component $\beta$ derived at step 6 is subtracted from the secondary air amount set in the immediately preceding cycle to perform a decreasing correction of the secondary air amount. Then the signal having the duty ratio corresponding to the secondary air amount corrected by the decreasing correction is applied to the electromagnetic valve 21.

Thus, by performing a feedback control for the secondary air amount so that the oxygen concentration detected by the sub-oxygen sensor 22 approaches the level corresponding to the theoretical air/fuel ratio (to approach the output of the sensor 22 toward the target value corresponding to the theoretical air/fuel ratio), the oxidation and reducing reaction in the catalyst 10 can be well balanced at a high level while maintaining the oxygen concentration while the air/fuel ratio control is performed by an Open Loop control and thus the setting of the air/fuel ratio becomes richer side than the theoretical air/fuel ratio and is equivalent to that while the oxygen concentration is controlled toward the theoretical air/fuel ratio.

On the other hand, at the engine start up where the air/fuel ratio is set to be particularly rich, the oxidizing combustion of HC and CO is promoted by supplying secondary air and quickly elevating the temperature of the catalyst 10 toward the active temperature, by the burning heat thus generated. Therefore, immediately after starting up the engine, the catalyst 10 becomes active and improves the exhaust characteristics.

There, during Open Loop control for the air/fuel ratio, it is possible for the air/fuel ratio to be set on the lean side. In such a case, since the oxygen concentration in the engine exhaust becomes higher than that in the theoretical air/fuel ratio, the secondary air amount is controlled to be zero by repeating a decreasing correction for the secondary air, at step 7, because, while the air fuel ratio is lean relative to the theoretical air/fuel ratio, a sufficient amount of oxygen for oxidizing HC and CO is present and a supply of oxygen from the secondary air may make the exhaust air/fuel ratio lean thereby resulting in degradation of the reducing performance of NOx.

Although the foregoing embodiment has the construction in which the oxygen sensor 16 is provided for the feedback control of the air/fuel ratio and the air/fuel ratio feedback control is performed on the basis of the air/fuel ratio detected by the oxygen sensor 16, the present invention is applicable even for an engine that does not have such an air/fuel ratio feedback control function.

On the other hand, even in the case of the air/fuel ratio feedback control, the oxygen sensor 16 can be constructed to perform a supply of the secondary air only when the Open Loop control for controlling the air/fuel ratio is performed as in the shown embodiment. In this case, the air/fuel ratio feedback control and the secondary air feedback control may be selectively conducted using the sub-oxygen sensor 22.

In addition, it is possible to learn of the result of the feedback control of the secondary air amount as set forth above, and perform the feedback control of the secondary air amount by taking the learned value at the corresponding operating condition as the initial value.

Furthermore, supply of the secondary air is stopped during an air/fuel ratio control in the shown embodiment. However, even during an air/fuel ratio feedback control, the air/fuel ratio may become substantially rich relative to the theoretical air/fuel ratio because of an error in the acceleration enrichment. Therefore, it may be possible to perform a supply of the secondary air on the basis of the output of the sub-oxygen sensor 22 when the exhaust air/fuel ratio becomes rich during an active state of the air/fuel ratio feedback control.

What is claimed is:

1. A method for controlling secondary air for an internal combustion engine comprising the steps of:
    detecting oxygen concentration at a position between a catalyst provided in an engine exhaust passage for emission control and a secondary air supply portion provided in said exhaust passage upstream of said catalyst;

setting an amount of said secondary air so that the detected oxygen concentration approaches a target value by detecting an intake air flow amount of the engine and varying the operational magnitude of the secondary air amount depending upon the detected intake air flow amount of the engine wherein the target value is a value corresponding to a theoretical air/fuel ratio;

controlling the supply of the secondary air on the basis of the set secondary air amount by opening an electromagnetic valve disposed in a path of pressurized secondary air, depending upon the set secondary air amount;

detecting oxygen concentration in the exhaust gas at a position upstream of said secondary air supply portion;

feedback controlling an air/fuel ratio of an air/fuel mixture to be introduced into the engine so that the detected oxygen concentration at a position upstream of said secondary air supply portion approaches a target value that is the same as the target value of said secondary air amount; and forcibly stopping the supply of said secondary air while said air/fuel ratio feedback control is active.

2. A method for controlling secondary air for an internal combustion engine comprising the steps of:

detecting oxygen concentration at a position between a catalyst provided in an engine exhaust passage for emission control and a secondary air supply portion provided in said exhaust passage upstream of said catalyst;

setting an amount of said secondary air so that the detected oxygen concentration approaches a target value;

controlling the supply of the secondary air on the basis of the set secondary air amount;

detecting oxygen concentration in the exhaust gas at a position upstream of said secondary air supply portion; and feedback controlling an air/fuel ratio of an air/fuel mixture to be introduced into the engine so that the detected oxygen concentration at a position upstream of said secondary air supply portion approaches a target value that is the same as the target value of said secondary air amount.

3. A method for controlling secondary air for an internal combustion engine as set forth in claim 2, wherein the step of setting said secondary air amount comprises the steps of:

detecting an intake air flow amount of the engine;

varying the operational magnitude of the secondary air amount depending upon the detected intake air flow amount of the engine.

4. A method for controlling secondary air for an internal combustion engine as set forth in claim 2, further comprising the step of forcibly stopping the supply of said secondary air while said air/fuel ratio feedback control is active.

5. A method for controlling secondary air for an internal combustion engine as set forth in claim 2, wherein said step of controlling the secondary air supply includes the step of opening an electromagnetic valve disposed in a path of pressurized secondary air, depending upon the set secondary air amount.

6. A method for controlling secondary air for an internal combustion engine as set forth in claim 2, wherein said target value in the step of setting said secondary air amount is a value corresponding to a theoretical air/fuel ratio.

7. A secondary air control system for an internal combustion engine comprising:

a catalyst disposed in an exhaust passage of the engine, for emission control;

secondary air adjusting means for adjusting the amount of secondary air to be supplied to the exhaust passage upstream of said catalyst wherein said secondary air adjusting means comprises an air pump, a pressure regulator and an electromagnetic valve, and wherein secondary air pressurized by said air pump and adjusted at a predetermined pressure by said pressure regulator is supplied in a controlled amount by said electromagnetic valve to said exhaust passage;

an oxygen sensor for detecting an oxygen concentration and disposed in said exhaust passage at a position between said catalyst and a secondary air supply portion;

secondary air amount feedback control means for feedback controlling a supply amount of the secondary air, the supply amount to be adjusted by said secondary air adjusting means so that an output value of said oxygen sensor approaches a target value wherein said target value is a value corresponding to a theoretical air/fuel ratio;

intake air flow amount detecting means for detecting an intake air flow amount of the engine;

operational magnitude varying means for varying the operational magnitude of the secondary air amount depending upon the detected intake air flow amount of the engine;

a second oxygen sensor for air/fuel ratio control and disposed in the exhaust passage at a position upstream of said secondary air supply portion and for generating a second output value in response to oxygen concentration in the exhaust gas;

air/fuel ratio feedback controlling means for adjusting the air/fuel ratio of an air/fuel mixture to be introduced into the engine so that the oxygen concentration detected by said second oxygen sensor for the air/fuel ratio control approaches a target value that is the same as the target value for said oxygen sensor in the secondary air amount feedback control means, at a predetermined engine operating condition; and secondary air forcibly stopping means for forcibly setting the amount of the secondary air adjusted by said secondary air adjusting means to zero while said air/fuel ratio feedback controlling means is active for feedback control of the air/fuel ratio.

8. A secondary air control system for an internal combustion engine comprising:

a catalyst disposed in an exhaust passage of the engine, for emission control;

secondary air adjusting means for adjusting the amount of secondary air to be supplied to the exhaust passage upstream of said catalyst;

an oxygen sensor for detecting an oxygen concentration and disposed in said exhaust passage at a position between said catalyst and a secondary air supply portion;

secondary air amount feedback control means for feedback controlling a supply amount of the secondary air, the supply amount to be adjusted by said secondary air adjusting means so that an output value of said oxygen sensor approaches a target value;

a second oxygen sensor for air/fuel ratio control and disposed in the exhaust passage at a position upstream of said secondary air supply portion and for generating a second output value in response to oxygen concentration in the exhaust gas; and air/fuel ratio feedback controlling means for adjusting the air/fuel ratio of an air/fuel mixture to be introduced into the engine so that the oxygen concentration detected by said second oxygen sensor for the air/fuel ratio control approaches a target value that is the same as the target value for said oxygen sensor in the secondary air amount feedback control means, at a predetermined engine operating condition.

9. A secondary air control system for an internal combustion engine as set forth in claim 8, further comprising:

intake air flow amount detecting means for detecting an intake air flow amount of the engine;

operational magnitude varying means for varying the operational magnitude of the secondary air amount depending upon the detected intake air flow amount of the engine.

10. A secondary air control system for an internal combustion engine as set forth in claim 8, further comprising secondary air forcibly stopping means for forcibly setting the amount of the secondary air adjusted by said secondary air adjusting means to zero while said air/fuel ratio feedback controlling means is active for feedback control of the air/fuel ratio.

11. A secondary air control system for an internal combustion engine as set forth in claim 8, wherein said secondary air adjusting means comprises an air pump, a pressure regulator and an electromagnetic valve, and secondary air pressurized by said air pump and adjusted at a predetermined pressure by said pressure regulator is supplied in a controlled amount by said electromagnetic valve to said exhaust passage.

12. A secondary air control system for an internal combustion engine as set forth in claim 8, wherein said target value of the output value of said oxygen sensor in the secondary air amount feedback control means is a value corresponding to a theoretical air/fuel ratio.

* * * * *